(12) United States Patent
Safavi et al.

(10) Patent No.: US 10,679,481 B2
(45) Date of Patent: Jun. 9, 2020

(54) METHOD AND APPARATUS FOR PROCESSOR-BASED MINI-SENSOR ASSEMBLY

(71) Applicant: Chaoyang Semiconductor Jiangyin Technology CO. LTD., San Diego, CA (US)

(72) Inventors: Saeid Safavi, San Diego, CA (US); Dhinakar Radhakrishnan, La Jolla, CA (US)

(73) Assignee: Chaoyang Semiconductor Jiangyin Technology, CO. LTD., San Diego, CA (US)

( * ) Notice: Subject to any disclaimer, the term of this patent is extended or adjusted under 35 U.S.C. 154(b) by 0 days.

(21) Appl. No.: 16/190,968

(22) Filed: Nov. 14, 2018

(65) Prior Publication Data
US 2020/0152036 A1     May 14, 2020

(51) Int. Cl.
  *G08B 21/02* (2006.01)
  *G06N 3/08* (2006.01)
  *G08B 21/18* (2006.01)

(52) U.S. Cl.
  CPC ............ *G08B 21/02* (2013.01); *G06N 3/08* (2013.01); *G08B 21/182* (2013.01); *G08B 21/187* (2013.01)

(58) Field of Classification Search
  CPC .... G08B 21/02; G08B 21/182; G08B 21/187; G06N 3/08
  See application file for complete search history.

(56) References Cited

U.S. PATENT DOCUMENTS

| | | | | |
|---|---|---|---|---|
| 2007/0010291 A1* | 1/2007 | Deng | .................. | G10L 21/0208 455/563 |
| 2012/0170412 A1* | 7/2012 | Calhoun | ............... | G01S 3/8083 367/118 |
| 2015/0180993 A1* | 6/2015 | Yamada | ................ | G06F 16/951 709/223 |

(Continued)

OTHER PUBLICATIONS

Boddapati, et al., "Classifying Environmental Sounds using Image Recognition Networks", Procedia Computer Science, 112 (2017), pp. 2048-2056.

(Continued)

*Primary Examiner* — Joseph H Feild
*Assistant Examiner* — Rufus C Point
(74) *Attorney, Agent, or Firm* — Jaquez Land Greenhaus LLP; Bruce W. Greenhaus, Esq.

(57) ABSTRACT

Systems and methods having a local processor at the extreme edge of an environmental monitoring/control system are disclosed. A sensor is provided in close proximity to the processing module. The processing module is a relatively simple processor capable of detecting the occurrence of one particular event, or a limited number of particular events. The processing is done with a relatively simple neural network. Processing module outputs indicate that a particular event has occurred. The processing module includes a memory into which values can be loaded that are determined by "pre-training" for use with the processing module. The downloading and use of such pre-trained values allows the processing module to efficiently detect particular events for which the values were pre-trained.

20 Claims, 15 Drawing Sheets

(56) References Cited

U.S. PATENT DOCUMENTS

2018/0306609 A1* 10/2018 Agarwal .................. H04L 67/12

OTHER PUBLICATIONS

Wikipedia, "Mel-Frequency Cepstrum", Oct. 10, 2018, 3 pgs.
Nisarga, et al., "A Robust Glass-Breakage Detector using the MSP430", Texas Instruments, Application Report, SLAA389, Feb. 2008, 24 pgs.
Tangkawanit, et al., "Development of Gunfire Sound Classification System with a Smartphone using ANN", The 3rd International Conference on Digital Arts, Media and Technology (ICDAMT2018), 2018, pp. 168-172.
Lim, et al., "Rare Sound Event Detection using 1D Convolutional Recurrent Neural Networks", Detection and Classification of Acoustic Scenes and Events, Nov. 16, 2017, Munich, Germany, 5 pgs.
Kao, et al., "R-CRNN: Region-based Convolutional Recurrent Neural Network for Audio Event Detection", Amazon Alexa, Aug. 20, 2018, 5 pgs.
Zhou, et al., "Abnormal Event Detection using Recurrent Neural Network", 2015 International Conference on Computer Science and Applications, pp. 222-226.

* cited by examiner

METHOD AND APPARATUS FOR PROCESSOR-BASED MINI-SENSOR ASSEMBLY

TECHNICAL FIELD

The disclosed method and apparatus relates to environmental sensors.

BACKGROUND

Environmental sensors are devices that are capable of detecting the status of the ambient environmental conditions in which the sensor is placed and can be used to detect changes in the environment. The particular environmental conditions that are detected can vary widely. That is, environmental sensors can sense environmental conditions such as: (1) sound, (2) light, (3) pressure (both air pressure and the amount of pressure that is directly exerted on the sensor by a solid in contact with the sensor), (4) touch, (5) motion, (6) temperature, (7) moisture, (8) humidity, (9) air flow; (10) fluid flow, etc. The use of such environmental sensors as IoT (Internet of things) devices is becoming ubiquitous in recent times, with the rise of environmental monitoring, and automated monitor and control systems for controlling, monitoring and affecting changes in the systems, machines and devices in which such sensors might be found. "IoT" or "Internet of things" is an informal term that is commonly used to refer to nonstandard computing devices that connect wirelessly to a network and have the ability to transmit data. The term relates to extending Internet connectivity beyond standard devices, such as desktops, laptops, smartphones and tablets, to a range of traditionally simple devices or physical devices that are not typically capable of communicating over the Internet, including everyday objects, such as audio speakers, toys, refrigerators, cars, watches, car keys, etc. However, when embedded with technology, these devices can communicate and interact over the Internet. Providing the ability to communicate over the Internet allows them to be remotely monitored and controlled and to receive information from remote devices and databases. In addition, several smart sensors are included within the scope of IoT devices. Such sensors can be used in systems such as smart meters, water meters, electric meters, etc., commercial security systems, smart city technology systems, etc. The number of types of such IoT devices continues to grow as people continue to expand their appreciation for the power of having a communication port to and from such common items.

Some examples in the area of environmental monitoring include cameras used for monitoring activity around a point of interest. Such cameras are found in a variety of locations to monitor the visual environment around such a point of interest and capture images regarding the activities that occur around such points of interest. In some cases, the cameras lie dormant until a particular change in an environmental condition occurs that indicates that an event has occurred that might be worth capturing on the camera. Examples of such a change in the environmental conditions might be: (1) a change in the volume of the ambient sound around the camera (either louder or softer); (2) motion that was not present previously; or (3) change in the amount of ambient light (either more or less ambient light). Several other factors could also be monitored to determine when to turn on the camera.

Supplementing the use of sensors for capturing such information regarding environmental conditions, the recent rise in the development of artificial intelligence and the use of neural networks to analyze information to draw conclusions about particular sets of environmental data have resulted in the use of sensors to collect data that can be analyzed to draw conclusions about the environment and to control systems that interact with the environment. For example, it is common today for cellular telephones to have microphones that can detect acoustic signals (i.e., sound waves), such as the sound of a user's voice. Artificial intelligence systems are used to perform voice recognition. Accordingly, a voice recognition processor can be coupled to the microphone in the cellular phone and used to detect voice commands issued by the user.

Currently, it is not uncommon for a processor that is in relatively close proximity to the sensor to perform at least a first level determination of the nature of the environmental data. That is, in the example of the cellular telephone with voice recognition noted above, a processor within the phone (i.e., in relatively close proximity to the microphone) may perform a first level voice recognition using a processor that fits within the power, size and weight constraints of the phone. Since the phone is typically capable of communicating with more powerful processor over the Internet, the output from the first level voice recognition performed locally in the phone is provided to the more powerful external processors to do the "heavy lifting" necessary to determine the nature of the request and to provide a response. In such cases, processing is performed in the phone by a programmable processor. As such, the processor is relatively complex, consumes a relatively large amount of power and has a relatively large size. In addition, the phone still relies on an external processing capability to perform complex pattern recognition that is typically performed by a neural network.

As artificial intelligence continues to proliferate and the recognition of more applications increases, the need for inexpensive, lightweight, small sensors will continue to grow. In addition, the number of different applications for such sensors will grow as well. Furthermore, the growth in the use of IoT devices that provide information about the environment in which they exist will result in a need for more bandwidth to communicate the information gathered and shared by such IoT devices. Such devices include smartphones, wearables, smart speakers, surveillance cameras, drones, machine vision robots, etc. These devices may be called upon to perform facial recognition, speech recognition, license plate recognition, fault detection, collision avoidance, etc. In addition, to bandwidth considerations, communications over the Internet make the data that is collected susceptible to interference. It can be seen that a larger amount of data being communicated means a greater likelihood of an error in the communication of that data, and a greater energy usage for transmitting raw data thereby constraining the use of solution in a wide variety of battery powered edge node scenarios. Furthermore, data that is transmitted to gateways within the Internet must be stored, taking up resources. Therefore, the greater the number of such devices, the larger the resources that need be available generally. Still further, people are becoming more aware of the need to be efficient in the use of power. Increasing the number of devices that require power to communicate data increases the amount of overall power required generally, in addition to the increase in the network or Internet traffic. In addition to these concerns, the latency between the processes that occur at the IoT device and the processes that are performed by other devices to which the IoT device interfaces through the Internet can cause IoT systems to be less efficient or less effective.

Another consideration in determine the architecture of sensors for use in controlling and monitoring systems is the manner in which the information from the sensors is processed to make decisions regarding the manner in which the system will react to various changes in the environment and detected events. Modern computers and edge processing devices are limited in many cases from achieving further performance gains by what is commonly known as the "memory wall problem". The memory wall problem is defined as the situation that occurs when a much faster processor is used with a relatively slow dynamic random access memory (DRAM). The mismatch in the speed results in the processor speed being masked by the relatively slow DRAM speed. Therefore, if the speed of memory available today does not keep up with the speed of the processors that rely upon that memory, the advantages of the faster processors will not be felt.

Therefore, there is currently a need and there will be an even greater need in the future, for sensors that can efficiently provide information to monitor and control systems that use environmental information to monitor, control and effect changes in systems in which the sensor is a component (i.e., sensors that use less power, bandwidth and size). In addition, there is a need in some cases for IoT and IIoT (industrial Internet of things) systems that can make decisions more quickly (i.e., with less latency). Furthermore, there is a need for systems that require less overall storage resources.

SUMMARY

Various embodiments of a processor-based mini-sensor assembly (PMA) are disclosed. The PMA comprises a PMA package, a sensor, such as an analog sensor and a processing module. The PMA package may be a solid cast plastic casing into which the components of the PMA are sealed. However, other designs are within the scope of the disclosed method and apparatus. The sensor may be any type of sensor, such an environmental sensor. For example, the sensor can be a microphone or other acoustic sensor, a camera or other light sensor, a temperature sensor, a moisture or humidity sensor, a pressure or touch sensor (either air pressure sensor or sensor for sensing the amount of pressure that is directly exerted on the sensor by a solid in contact with the sensor), an air flow sensor, a fluid flow sensor, etc. In some embodiments, the sensor may be a combination of such environmental sensors, for example, an acoustic sensor coupled with a light sensor.

The processing module may be a low-power local processor at the extreme edge of an environmental monitoring/control system (such as a system designed for use with IoT devices). The sensor is in close proximity to the processing module. This allows the two components to be mounted together in the same PMA package. In contrast, in some embodiments, the output of the PMA is provided to a more complex processor or to another component of a more complex system that is at a relatively large distance from the PMA. For example, in some embodiments, the PMA communicates through: (1) the Internet; (2) an intranet; (3) a local area network (LAN); (4) a wide area network (WAN), or otherwise through wireline or wireless communications network, or a combination of the above, with other components of the IoT system.

In some embodiments, the processing module is a relatively simple processor capable of detecting the occurrence of one particular event, or a limited number of particular events. In some embodiments, the processing module may have the ability to perform data analytics, such as removing redundancies in the data, fingerprinting (i.e., pattern detection, etc.), detection of a scenario or creation of a useful context. Detection of the event or events that the processing module is capable of detecting may require artificial intelligence, such as machine learning (ML) architectures. Nonetheless, in some embodiments, the processing can be done with a relatively simple fully connected (FNN) and/or more complex neural network architectures like a convolutional neural network (CNN), Recurrent Neural Network etc. In some embodiments, the processing module outputs an indication that a particular event has likely occurred and a confidence level indicating the likelihood that the event occurred. In addition, in some embodiments, the processing module outputs processed data. In some embodiments, an additional alarm output is provided if a particular event is detected. In yet another embodiment, the PMA outputs signals to engage specific software or a mobile application that can take action in response to the event detection. For example, this action can be placing an automated call to 911 through a mobile phone, or vibrating a wearable device (e.g., smart watch) to alarm the user. The processing module includes a memory into which values can be loaded that are determined by "pre-training" for use with the processing module. The downloading and use of such pre-trained values allows the processing module to efficiently detect particular events for which the values were pre-trained.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. When the same reference designation is shown in more than one figure, each of the features associated with that reference designation are the same.

These drawings are provided to facilitate the reader's understanding of the disclosed method and apparatus. It should be noted that the figures are not intended to be exhaustive or to limit the claimed invention to the precise form disclosed. It should be further understood that the disclosed method and apparatus can be practiced with modifications and alterations, and that the disclosure should include embodiments in which features of a particular example shown in one figure can be used together with compatible features shown in other figures. In addition, it should be noted that the features shown are not necessarily to scale.

DETAILED DESCRIPTION

Figure 1:
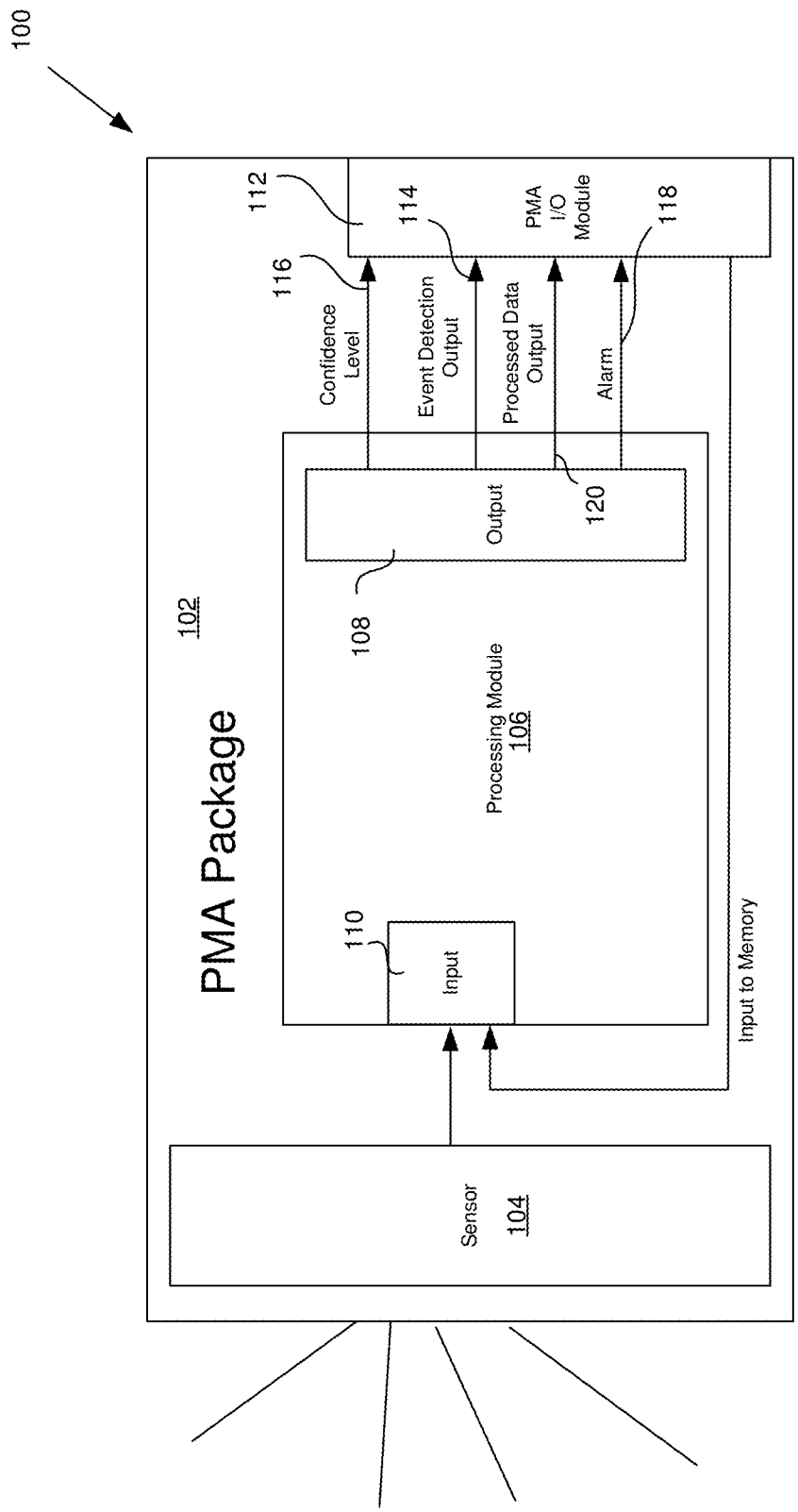
FIG. 1 is an illustration of a processor-based mini-sensor assembly (PMA).

FIG. 1 is an illustration of a processor-based mini-sensor assembly (PMA) 100 in accordance with some embodiments of the disclosed method and apparatus. The PMA 100 comprises a PMA package 102, a sensor, such as an analog sensor 104, and a processing module 106. In some embodiments, the PMA package 102 is a solid cast plastic casing into which the components of the PMA 100 are sealed. Accordingly, in some embodiments, similar to the package of an integrated circuit, the contents of the PMA 100 are sealed in a hermetic package that is not intended to be opened by a user. However, other designs are within the scope of the disclosed method and apparatus.

The sensor 104 may be any sensor, such an environmental sensor. For example, the sensor 104 can be a microphone or other acoustic sensor, a camera or other light sensor, a temperature sensor, a moisture or humidity sensor, a pressure or touch sensor (either air pressure sensor or sensor for sensing the amount of pressure that is directly exerted on the sensor by a solid in contact with the sensor), an air flow sensor, a fluid flow sensor, etc. In some embodiments, the sensor 104 may be a combination of such environmental sensors, for example, an acoustic sensor coupled with a light sensor.

The processing module 106 is a local processor that resides at the extreme edge of an environmental monitoring/control system. As such, the physical and electrical distance between the input 110 of the processing module 106 and the output of the sensor 104 is very small. Accordingly, the processing module 106 is tightly coupled to the sensor 104. The close proximity of the sensor 104 to the processing module 106 allows the two components to be mounted together in the same PMA package 102. In contrast, in some embodiments, the output of the PMA 100 is provided to a more complex processor or to another component of a more complex system that is at a relatively large distance from the PMA 100. For example, in some embodiments, the PMA 100 communicates with the other components of the system of which the PMA 100 is a part through: (1) the Internet; (2) an intranet; (3) a local area network (LAN); (4) a wide area network (WAN), or otherwise through wireline or wireless communications network. In some embodiments, the PMA 100 can reside within a cellular phone, allowing the PMA 100 to communicate with an application run on the cellular phone processor and access the cellular communication channel.

In some embodiments, the processing module 106 is a relatively simple processor capable of detecting the occurrence of one particular event, or a limited number of particular events. In some such embodiments, the processing module 106 is dedicated to identifying the occurrence of an event and functions directly related to that identification function. For example, in some embodiments, the processing module 106 may have the ability to perform data analytics, such as removing redundancies in the data, fingerprinting (i.e., pattern detection, etc.), detection of a scenario or creation of a useful context. Detection of the event or events that the processing module 106 is capable of detecting may require artificial intelligence. Nonetheless, in some embodiments, the processing can be done with a relatively simple fully connected or convolutional neural network. In some embodiments, the processing module 106 outputs an indication through an output port 108 that a particular event has likely occurred on a first output line 114. In some such embodiments, the processing module 106 also provides a second output line 116 on which the processor 106 outputs a confidence level indicating the likelihood that the event occurred. In addition, the processing module 106 outputs through the PMA output port 112 processed data that can assist with determining events other than the event for which the processing module 106 is optimized to detect. In some embodiments, an additional alarm output is provided if a particular event is detected with a predetermined likelihood.

The PMA 100 in which the processing module 106 is at the farthest edge of the network (i.e., as close to the sensor as possible, both in terms of physical distance and logical distance) results in the following advantages: (1) enhanced system security/privacy, (2) increased reliability (i.e., reduced error rates), (3) reductions in data redundancy, (4) reductions in the amount of bandwidth required, (5) reductions in system latency, (6) reduction in power consumption (i.e., increase in battery life), (7) reductions in cost, and (8) improved user experience. In addition, the PMA 100 provides a multipurpose platform that can be reconfigured for various applications and uses. As will be seen in greater detail below, the processing module 106 of the PMA 100 includes a memory into which values can be loaded that are determined by "pre-training" for use with the processing module 106. The downloading and use of such pre-trained values allows the processing module 106 to efficiently detect particular events for which the values were pre-trained.

Figure 2:
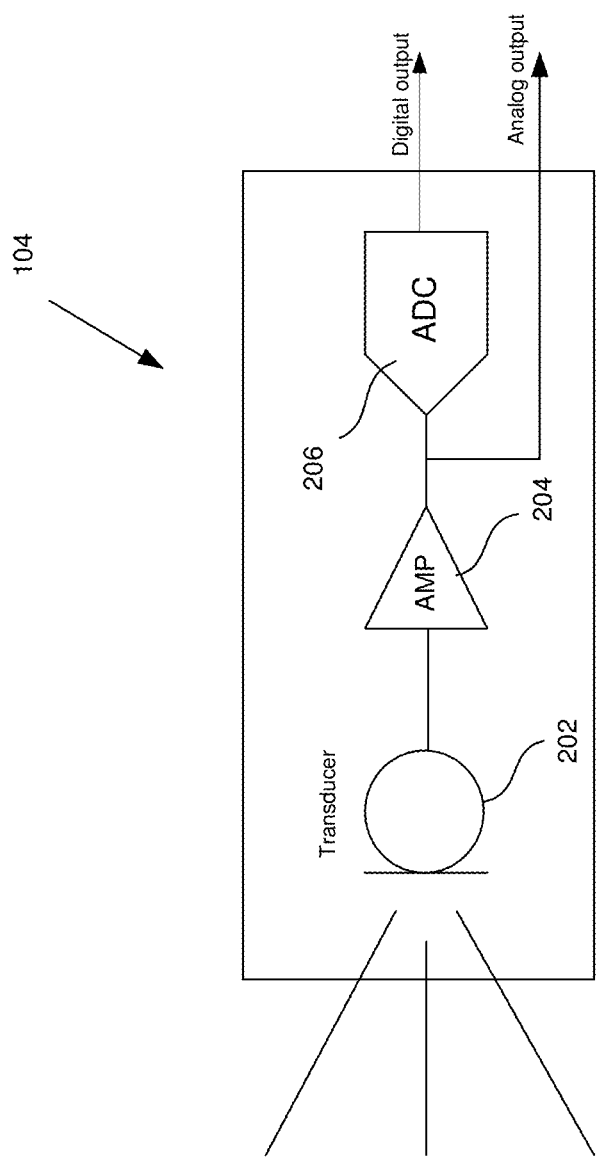
FIG. 2 is a simplified block diagram of a sensor in accordance with some embodiments of the disclosed method and apparatus.

FIG. 2 is a simplified block diagram of a sensor 104 in accordance with some embodiments of the disclosed method and apparatus. The sensor 104 comprises a transducer 202, such as a microphone, an amplifier 204 and an analog-to-digital converter (ADC) 206.

Figure 3:
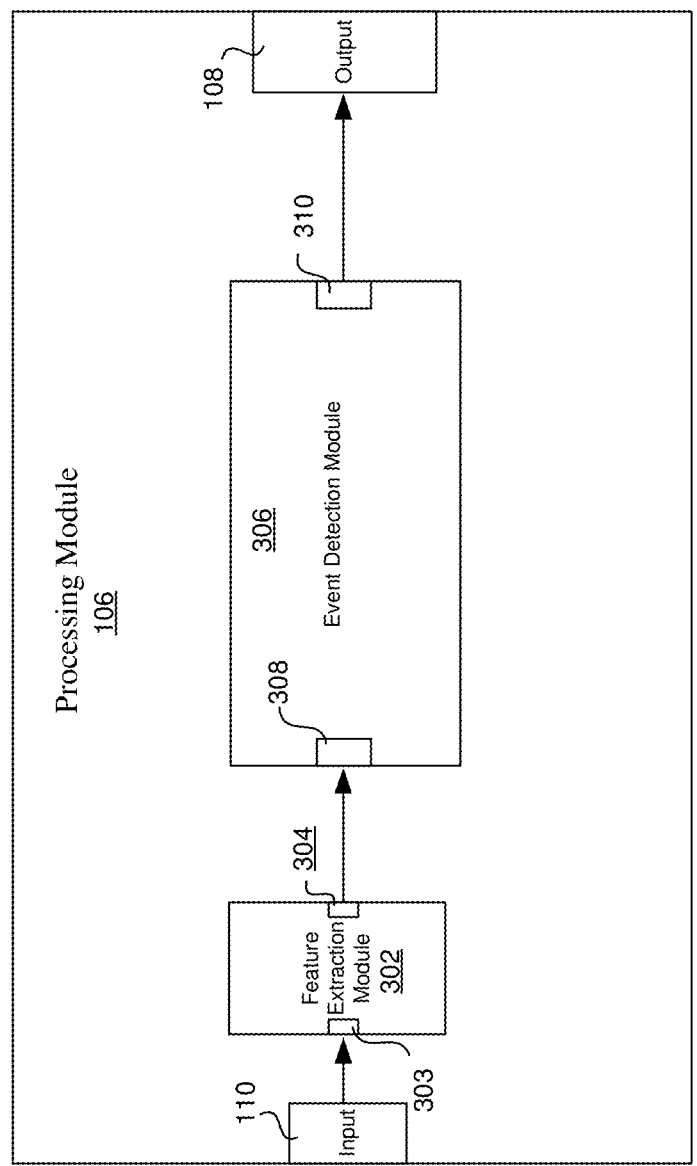
FIG. 3 is a simplified block diagram of the processing module in accordance with some embodiments of the disclosed method and apparatus.

FIG. 3 is a simplified block diagram of the processing module 106 in accordance with some embodiments of the disclosed method and apparatus. The input of the processing module 110 is coupled to an input 303 of a feature extraction module 302. Accordingly, the output of the sensor 104 is coupled to the input 303 of the feature extraction module 302. The output 304 of the feature extraction module 302 coupled to the input 308 of an event detection module 306. The event detection module 306 is optimized to provide data to event detection module 306 that is derived from the output signals from the sensor 104. For example, in some embodiments, the feature extraction module 302 comprises a Mel-frequency cepstrum processor.

Figure 4:
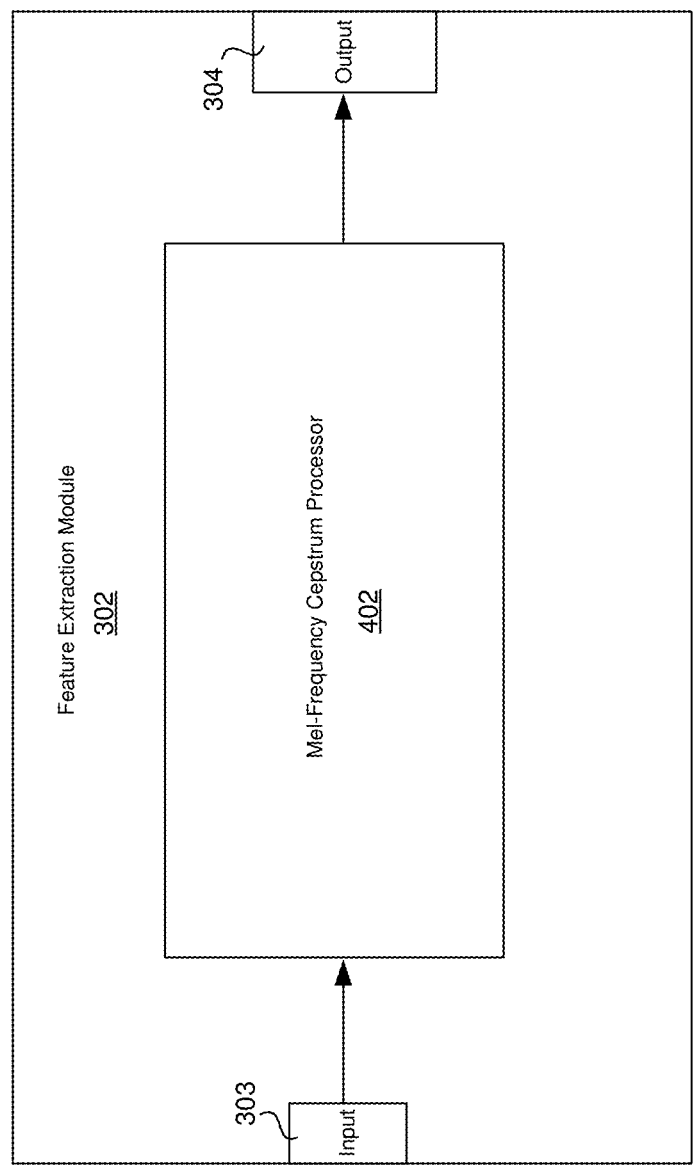
FIG. 4 is a simplified block diagram of a feature extraction module comprising a Mel-frequency cepstrum processor in accordance with some embodiments of the disclosed method and apparatus.

FIG. 4 is a simplified block diagram of a feature extraction module 302 comprising a Mel-frequency cepstrum processor 402 in accordance with some embodiments of the disclosed method and apparatus. The Mel-frequency cepstrum (MFC) processor 402 uses Mel-frequency Cepstral Coefficients (MFCCs) to perform the feature extraction procedure.

Figure 5:
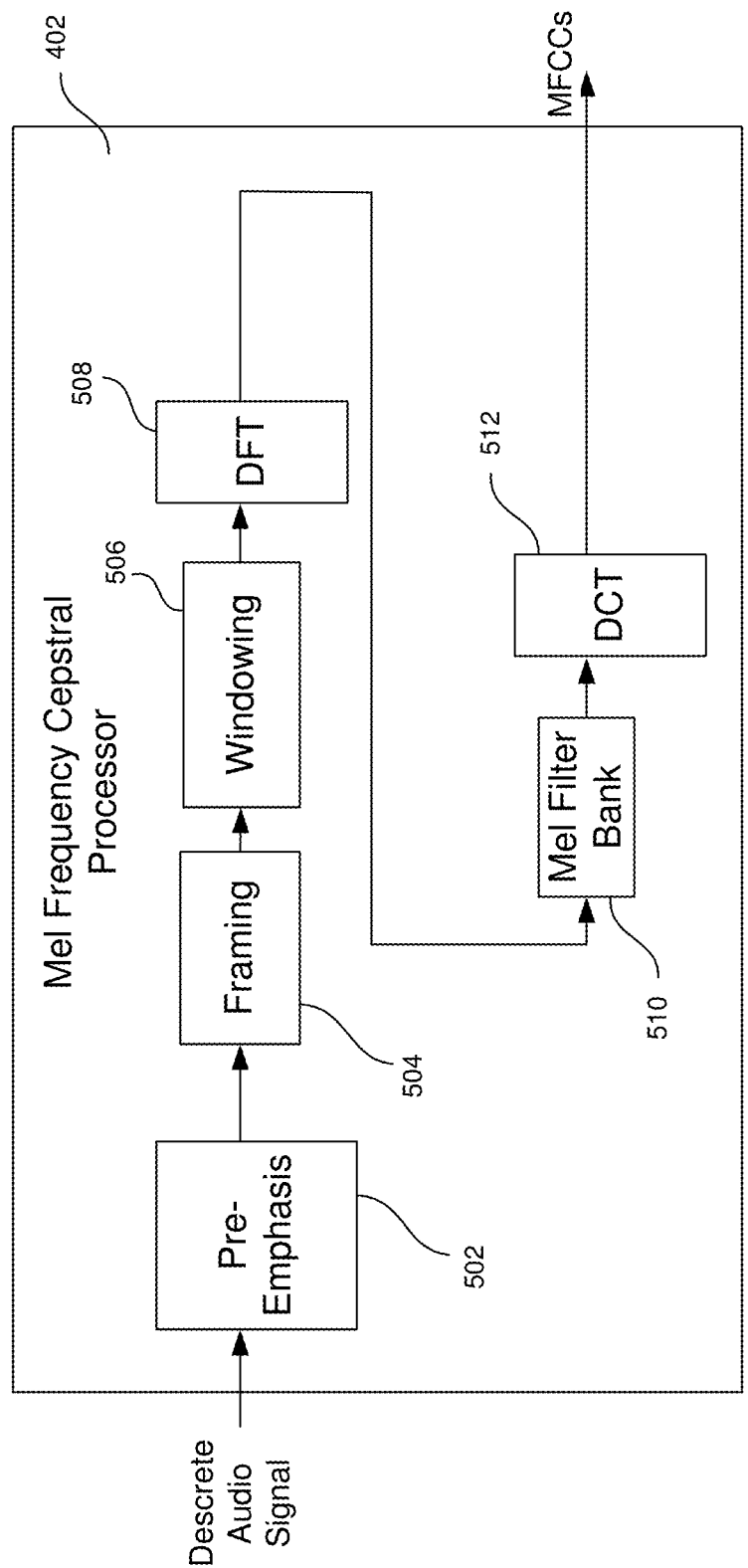
FIG. 5 is a simplified block diagram of the MFCC processor in accordance with some embodiments of the disclosed method and apparatus.

FIG. 5 is a simplified block diagram of the MFC processor 402 in accordance with some embodiments of the disclosed method and apparatus. A pre-emphasis module 502 at the front end of the MFC processor 402 ensures that the amplitudes of the signals to be processed are within the range desired. In particular, in some embodiments in which the input signal is an audio signal representing speech, pre-emphasis is a way of compensating for the rapidly decaying spectrum of the speech signal. Next, the output of the pre-emphasis module 502 is input to a framing module 504. The framing module 504 breaks the signal into overlapping frames that can be operated upon. Once the framing has been performed, the output of the framing module 504 is coupled to the input of the windowing module 506. The windowing module 506 applies a filter to a set of overlapping windows from which a discrete Fourier transform (DFT) module 508 will perform a DFT function. The output of the DFT module 508 is coupled to a Mel filter module 510. The Mel filter module 510 applies the Mel filter functionality to the output of the DFT module 508. The Mel filters map the spectrum of the signal into the Mel scale. In some embodiments, triangular overlapping windows are applied by the windowing module so that the transformed and filtered signal will contain the full content of the original signal. In some embodiments, the Mel filter module 510 also takes the log of the powers at each of the Mel frequencies. The output of the Mel filter module 510 is then applied to the input of a discrete cosine transform module 512. The signal is then output to event detection module 306.

Figure 6:
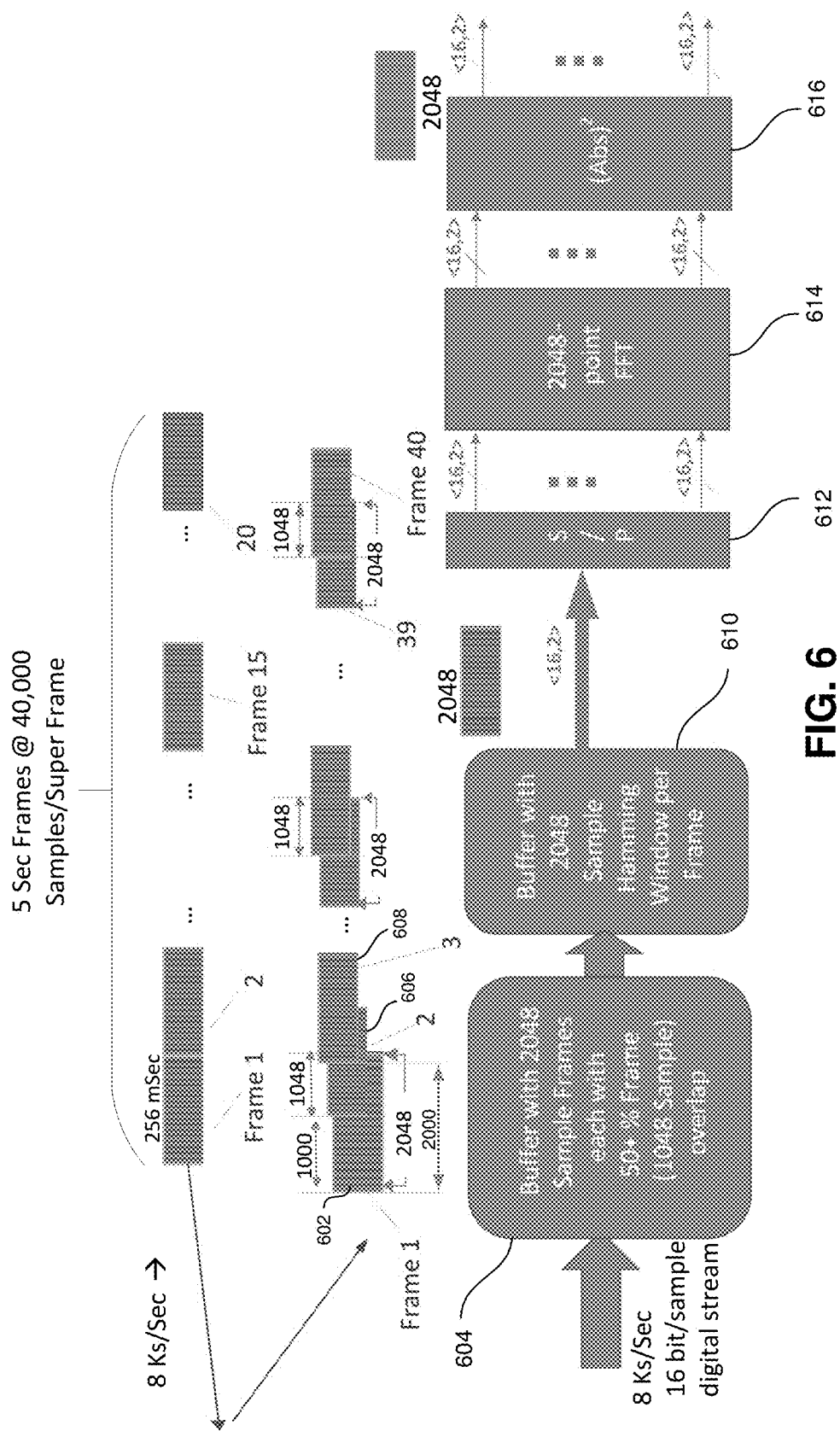
FIG. 6 is an illustration of another example of a feature extraction process front-end and associated hardware.

FIG. 6 is an illustration of another example of a feature extraction process front-end and associated hardware. Data is provided in blocks of 40,000 samples taken over a period of 5 seconds. Accordingly, samples are taken at a rate of 8,000 samples per second. A frame 602 is 256 msec long. Accordingly, each such frame has 2,048 samples. Upon receipt of data, the data is stored in a buffer 604 as frames of 2048 samples. Each frame overlaps the previous frame by 1048 samples. Accordingly, the second frame 606 stored in the buffer 604 overlaps the first frame 602 by 1048 samples. Likewise, the third frame 608 overlaps the second frame by 1048 frames. Accordingly, the distance between the start of the first frame and the start of each subsequent frame is 1000 samples (125 msec). It can be seen that for a superframe of 40,000 samples, there will be 19 full frames of 2048 samples each. In addition, there will be a partial frame of 1088 samples remaining. That is, 19×2048=38,912, which is 1088 short of the 40,000 samples received in one superframe. Therefore, a pad of 960 samples with value zero are used to complete the 20$^{th}$ frame. Because the 20 frames overlap by 1048 samples, the buffer has to hold 40 frames of 2048 samples in which the first 1048 samples of each frame are the same as the last 1048 samples of the previous frame.

Next, the data is stored in a second buffer 610. This second buffer applies a Hamming window to soften the edges of the data in preparation for the forthcoming fast Fourier transform (FFT). However, before the FFT can be performed, the data is first shifted from a serial stream to a parallel data output by a serial-to-parallel (S/P) converter 612. The convention used in FIG. 6 is to write "<16, 2>" to indicate that the relative value represented by the bits of the sample is a sixteen bit value with a decimal point after the first two bits. Accordingly, the largest value that can be represented is a sixteen bit value of all ones represented by a<16, 16> value, i.e., a sixteen bit value with no digits to the right of the decimal point. The smallest non-zero value would be $2^{-15}$, which would be represented as a value with all zeros but the last binary digit and represented by a signed <16, 0> value, i.e., a sixteen bit value with all digits to the right of the decimal point. The parallel output of the S/P converter 612 is applied to the 2048-point FFT 614. The output of the FFT 614 is coupled to a squaring circuit 616 (i.e., a circuit that raises the value to the second power, resulting in the output having a positive value whether the input is negative or positive.

Figure 7:
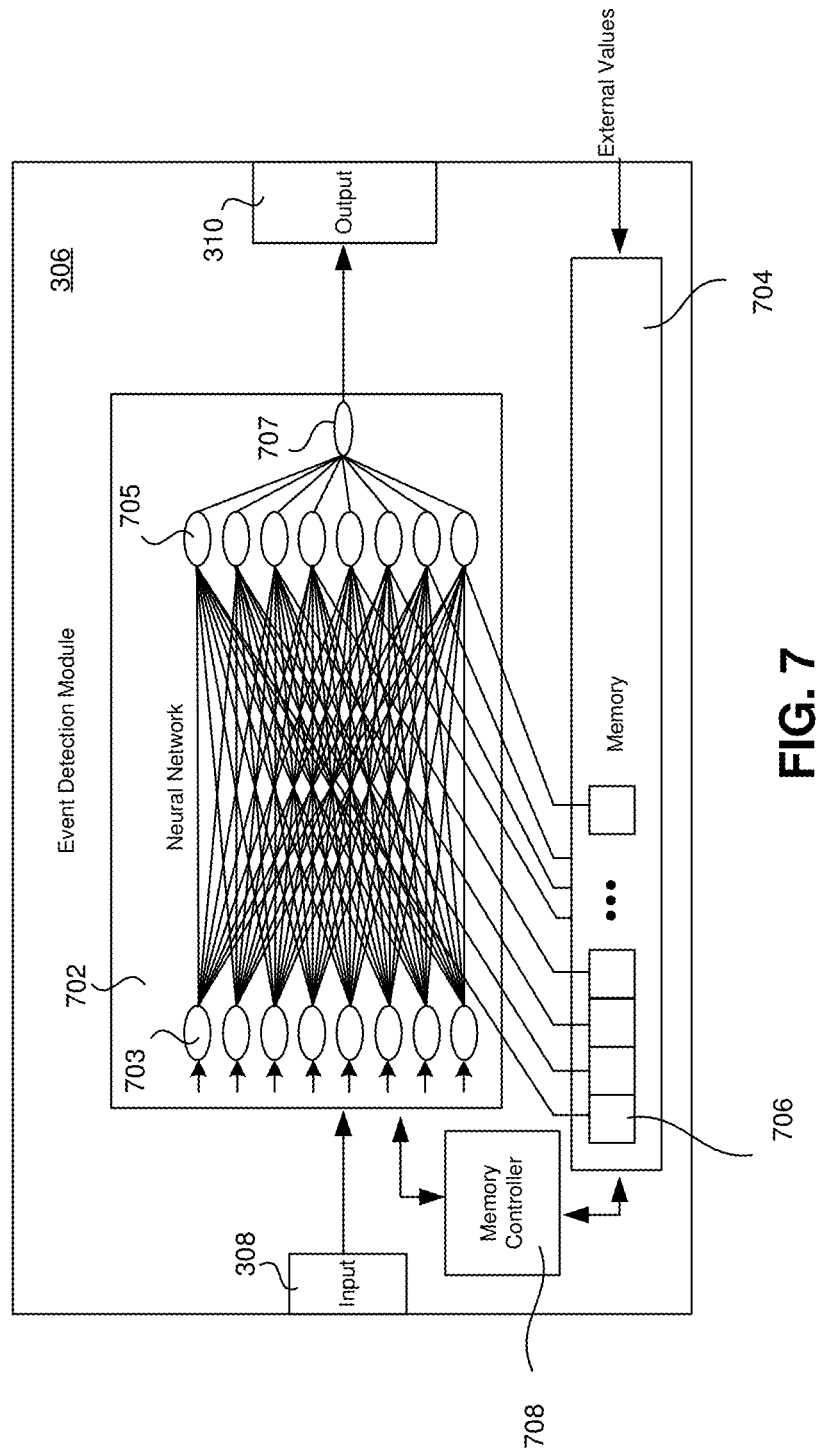
FIG. 7 is a simplified block diagram showing the components of the event detection module in accordance with some embodiments of the disclosed method and apparatus.

FIG. 7 is a simplified block diagram showing the components of the event detection module 306 in accordance with some embodiments of the disclosed method and apparatus. In some embodiments, such as the embodiment shown in FIG. 7, the event detection module 306 receives data from the feature extraction module 302. The data is coupled to the event detection module 306 through the input 308. The input 308 couples the data to an event detection processing device, such as the neural network 702 shown in FIG. 7. In the simplified block diagram of the neural network 702, a set of input nodes 703 each receive the information provided by the feature extraction module 302. The information is passed from the input node to a plurality of hidden layer nodes 705. The hidden layer nodes 705 each combine the information provided by the input nodes 703 with a bias value. The weighted output from each hidden layer node 705 are combined in an output node 707. In some embodiments, the bias values applied in the hidden nodes 705 are weights provided to the event detection module 306 by an external source and stored within a memory 704. In some embodiments, the memory 704 resides within the event detection module 306, as shown in FIG. 7.

In some such embodiments, weights 706 stored in memory locations within the memory 704 are determined by a training procedure that is performed in the external device. The training procedure determines the values of the weights 706 that will allow the neural network 702 to detect patterns in the output of the feature extraction module that indicate that a particular event has occurred. In some such embodiments, the weights 706 are very specifically determined to enable the neural network to detect only one very specific type of event. For example, in some embodiments, the external device performs a training process to determine weights 706 that applied to the neural network, allow the neural network to detect the sound of a gunshot as heard by an audio sensor (i.e., a microphone) within the PMA 100. By making the neural network relatively simple and keeping the number of layers to a minimum, the power consumption and die size can be minimized.

In some embodiments, such training is performed in the external device such as a cloud server without the need to communicate with the PMA 100. Alternatively, the training is done in an external device, but the PMA 100 provides samples of the information collected by the sensor 104 and processed by the feature extraction module 302. These samples can be used during the training to set a baseline for the ambient condition around the PMA 100 during "normal" periods (i.e., periods when the event for which the neural network 702 is being trained is not present). In addition, samples of the output of the sensor 104 and associated output of the feature extraction module 302 are provided to the external device responsible for training the neural network (i.e., responsible for determining the values of the weights to be applied to the neural network). Such samples may be taken by the PMA 100 by creating the event for training purposes in the presence of the PMA 100. Alternatively, the samples can be simulated based upon an understanding of what is expected to be output from the feature extraction module 302 upon the occurrence of the event for which the PMA 100 is being trained.

In some such embodiments, once the training is complete and the value of the weights 706 has been determined, the weights 706 are communicated to the memory 704 within the PMA 100. In some such embodiments, a memory controller 708 can control the process of loading the weights 706 from the external source into the memory 704. In some embodiments, the memory 704 can maintain more than one set of weights, wherein the values of each set of weights were determined to detect a different event. In such embodiments, the memory controller 708 selects which set of weights are to be applied to the hidden nodes 705 of the neural network 702. In some embodiments, the memory controller 708 can selectively request particular weights that have been determined for the detection of a desired event. For example, the memory controller 708 can request weights that can detect a gunshot. Upon detection of a gunshot by the event detection module 306, the memory controller 708 can request another set of weights that can then be used by the event detection module 306, and more particularly by the neural network 702 to detect events that would be relevant in the aftermath of a gunshot being fired. In some embodiments, the mechanism of FIG. 7 may be trained to detect a multitude of audio labels such as people screaming, glass breaking, door opened, etc. simultaneously with the main label (gun shot in the above example). This process is sometimes called audio tagging, which could result in a higher accuracy in the audio event detection. For example, when a gun is fired, a glass window, door, mirror or wall may break, or people might scream. The combination of these audio scenarios provides a more accurate event detection and reduce the possibility of a false alarm (e.g., false indication of a gunshot). In addition, or alternatively, a request can be submitted by the memory controller 708 to download weights for detecting the sounds that a victim of a gunshot might be likely to make, including such sounds as moaning and other sounds associated with the pain resulting from a gunshot wound.

The output of the neural network 702, taken from the output node 707, is coupled through the output 310 of the event detection module 306 to the output port 108 of the processing module 106. In some embodiments, the output from the output port 108 of the processing module 106 includes n output lines, including an event detection output provided on the output line 114, an indication provided on a second output line 116 indicating the level of confidence associated with the event detection output, an alarm output provided on a third output line 118, and processed data output on a fourth output line 120. Each "output line" may be implemented as several individual signal lines, that taken together provide the indication presented by the output line at issue. These output lines can also directly create information for a software module or mobile application to take certain actions such as calling 911, or sending amber alerts.

In some embodiments, the event detection output provided on the output line 114 is a single digital output that is in a first digital state to indicate that the event has not yet occurred and a second digital state to indicate that the event had occurred after the last time the state of the event detection output was reset. Alternatively, in some embodiments in which the neural network is capable of using the values of the weights applied to the hidden nodes 705 to detect more than one type of event, several lines can be used to provide an indication as to which of these several events have been detected. In one case, the output may be digital value presented by binary digits, each binary digit being output on a separate signal line. Alternatively, the output may be provided as a serially presented digital value indicating which, if any, event had been detected.

In some embodiments, the level of confidence is provided as a value indicating the probability that the event indicated by the event detection output occurred. For example, the probability may be presented as an 8 level output, with each level represented by one of the eight states of a three digit binary value, which may be provided on three separate signal lines or output as a serially presented digital value on one signal line.

In some embodiments, the alarm presented on output line 118 is a digital value that is in a first state to indicate an alarm condition and in a second state to indicate a no-alarm condition. In some embodiments in which several different alarms may be possible for different detected events, the output provided on the output line 118 may be a digital value provided on separate signal lines, each representing a digit of a binary value or output as a string of bits in a serially presented digital value over one signal line.

In some embodiments, the processed data output provided on the output line 120 is an output from the neural network 702 that may be an intermediate output that can be combined with other information at an external processing device to make determinations that are beyond the ability of the PMA 100 to make.

Figure 8:
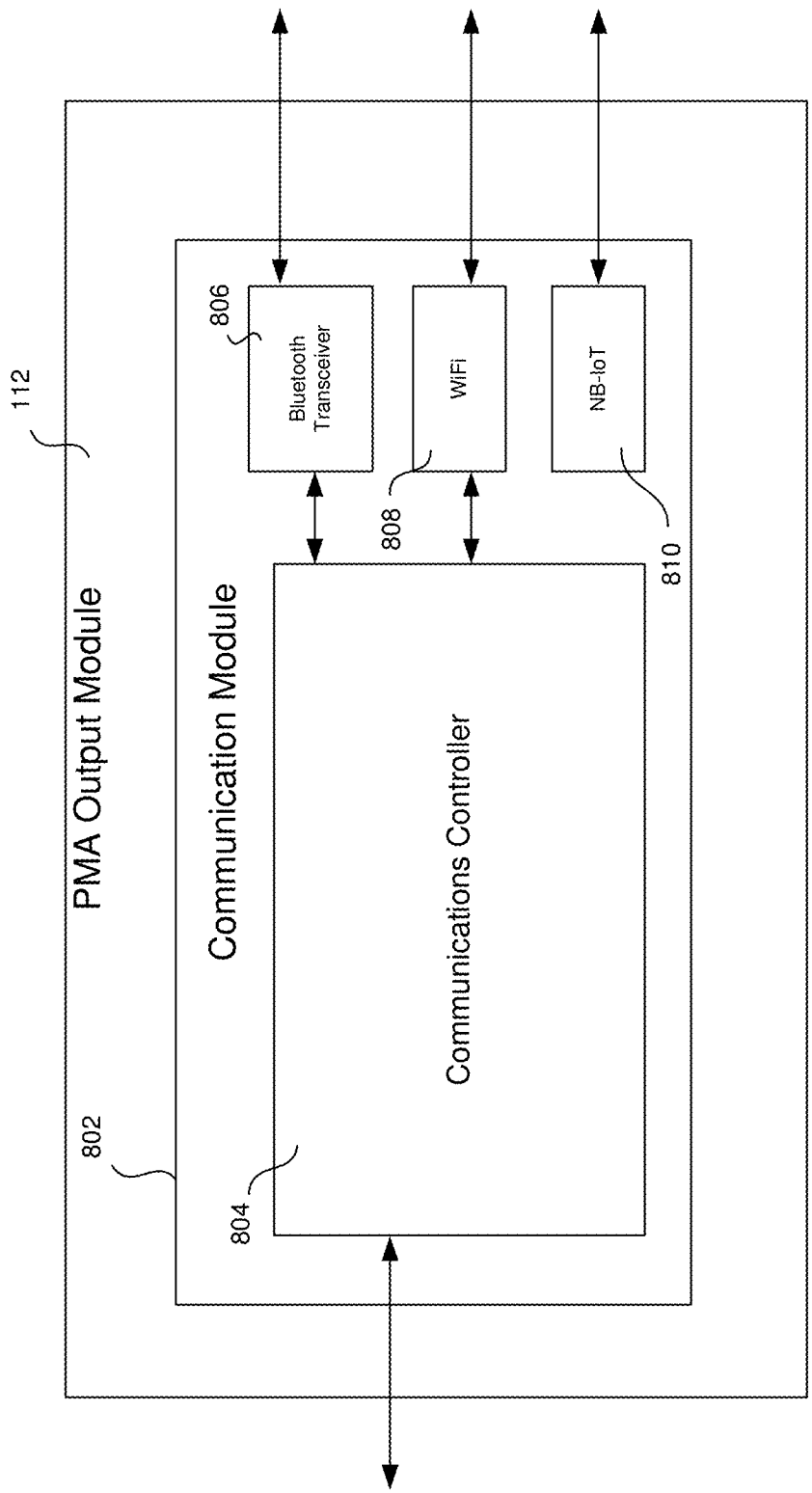
FIG. 8 is a simplified block diagram of the PMA output module in accordance with some embodiments of the disclosed method and apparatus.

FIG. 8 is a simplified block diagram of the PMA output module 112 in accordance with some embodiments of the disclosed method and apparatus. The PMA output module 112 comprises a communication module 802. The communications module 802 comprises a communications controller 804 and several transceivers, such as a Bluetooth transceiver 806, a WiFi transceiver 808 and a narrowband IoT (NB-IoT) transceiver 810. Other transceivers, such as a CDMA, WCDMA, GSM, GSM EDGE, Mobile WiMAX, or transceivers for use with other such cellular networks, including 4G and more advanced cellular networks or wired transceivers like Ethernet, serial connection etc., may be provided in addition to, in combination with some, or instead of the transceivers shown.

Information to be transmitted is provided to the communications controller 804 from the output port 108 of the processing module 106. The information may include such things as an event detection indication, a confidence level indication, processed data and/or an alarm, as shown in FIG. 1. In some embodiments, the communication controller 804 then schedules and manages the transmission of the information through an appropriate one of the transceivers 806, 808, 810. Similarly, in some embodiments, when information is received by one or more of the transceivers 806, 808, 810 the communications controller 804 manages the interface between the transceiver and the processing module 106.

In other embodiments, one or more of the transceivers 806, 808, 810 have sufficient communication management capability to directly interact with the processing module 106. Furthermore, while the PMA output module.

Figure 9:
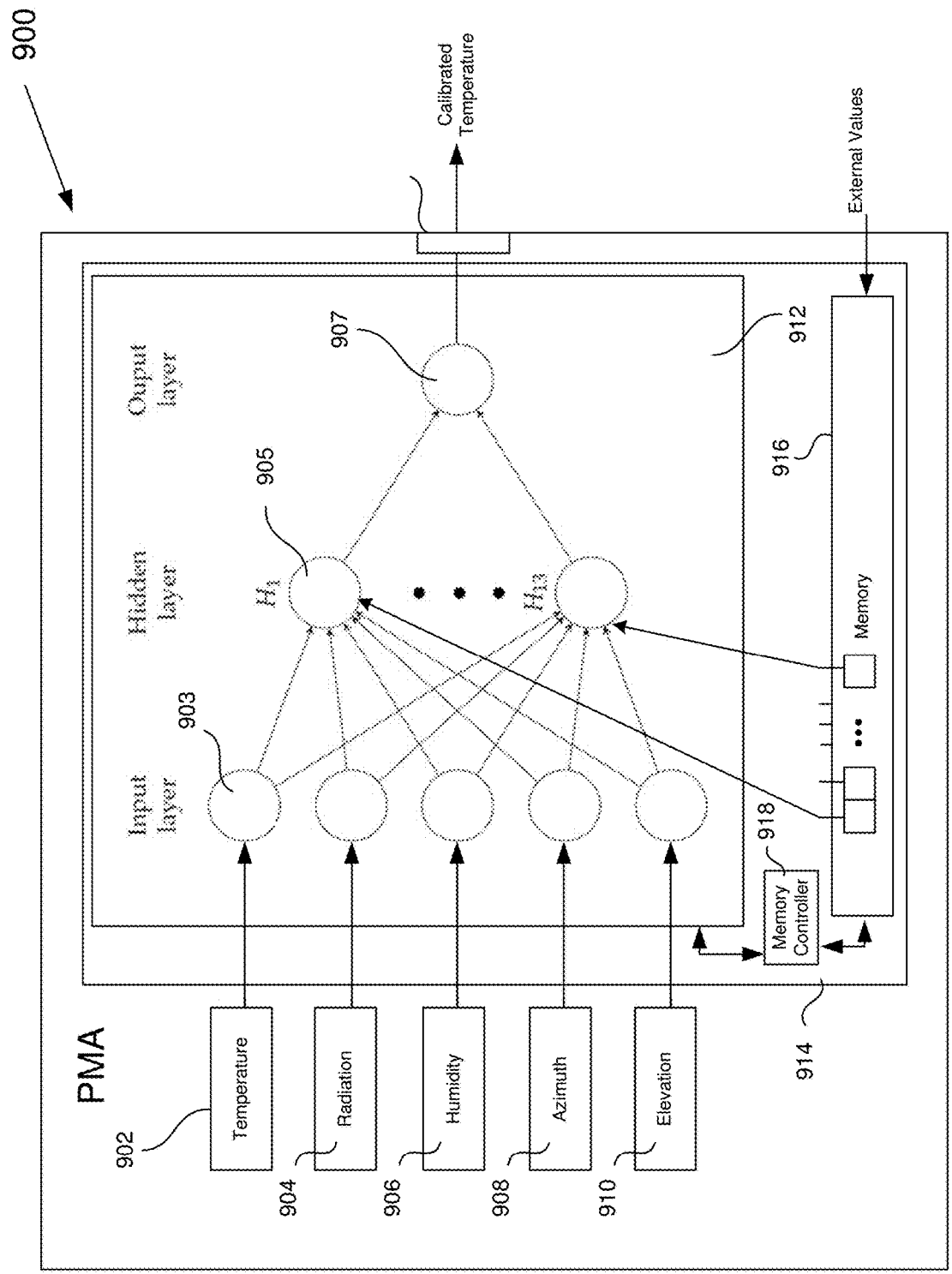
FIG. 9 is a simplified diagram illustrating use of a PMA 900 which can be used to enhance the accuracy of an environmental parameter measurements based on other environmental parameters that can affect the measurement accuracy.

FIG. 9 is a simplified diagram illustrating use of a PMA 900 that can be used to enhance the accuracy of an environmental parameter measurements based on other environmental parameters that can affect the measurement accuracy. More specifically, FIG. 9 shows an architecture for performing accurate temperature measurements in accordance with the disclosed method and apparatus. Temperature measurements are strongly influenced by environmental factors, such as solar radiation, humidity, wind speed, rainfall, etc. The influence of these factors makes it difficult to provide a low-cost thermometer that is accurate when subjected to such factors. That is, the principle way in which highly accurate thermometers are made is by covering an air temperature sensor with a radiation shield made from a material with a high heat capacity. In addition, mechanisms are provided that prevent condensation from forming in the cover of the sensor. Such provisions make such high accuracy air temperature sensors expensive.

A PMA 900 in accordance with some embodiments of the disclosed method and apparatus comprises several sensors 902, 904, 906, 908, 910. The first of these sensors 902 senses temperature; the second sensor 904 senses solar radiation; the third sensor 906 senses humidity; the fourth sensor 908 senses azimuth; the fifth sensor 910 senses elevation. The output from each of these sensors is coupled to an associated input node 903 of a neural network 912 within an event detection module 914. Similar to the neural network 702 described above with respect to FIG. 7, the output of the input each input node 903 provides an input to a hidden node 905 with the neural network 912. Each hidden node combines the outputs from each of the input nodes 903 with a weight, the value of which is stored in a memory 916. In the embodiment shown in FIG. 9, there are thirteen such hidden nodes 905. Accordingly, there will be thirteen weights stored in the memory 916. A memory controller 918 manages the storing and applying of the weights. In some embodiments, the weights are downloaded from an external device that determines the values of the weights based on samples of the ambient conditions sensed by the sensors 902, 904, 906, 908, 910 at a particular time and a known value for the temperature at the particular time the samples were taken. The sum of the thirteen hidden nodes 905 are summed in an output node 907. The training of the neural network to determine the values of the weights can be done for the particular environment in which the PMA 900 is placed. A new training can be performed if the PMA 900 is moved to a location that requires a new calibration to be performed.

The output of the output node 907 is then coupled to the output 920 of the PMA 900. The output signal provided through the output 920 indicates a temperature that has been calibrated to take into account each of the environmental conditions sensed by the sensors.

Figure 10:
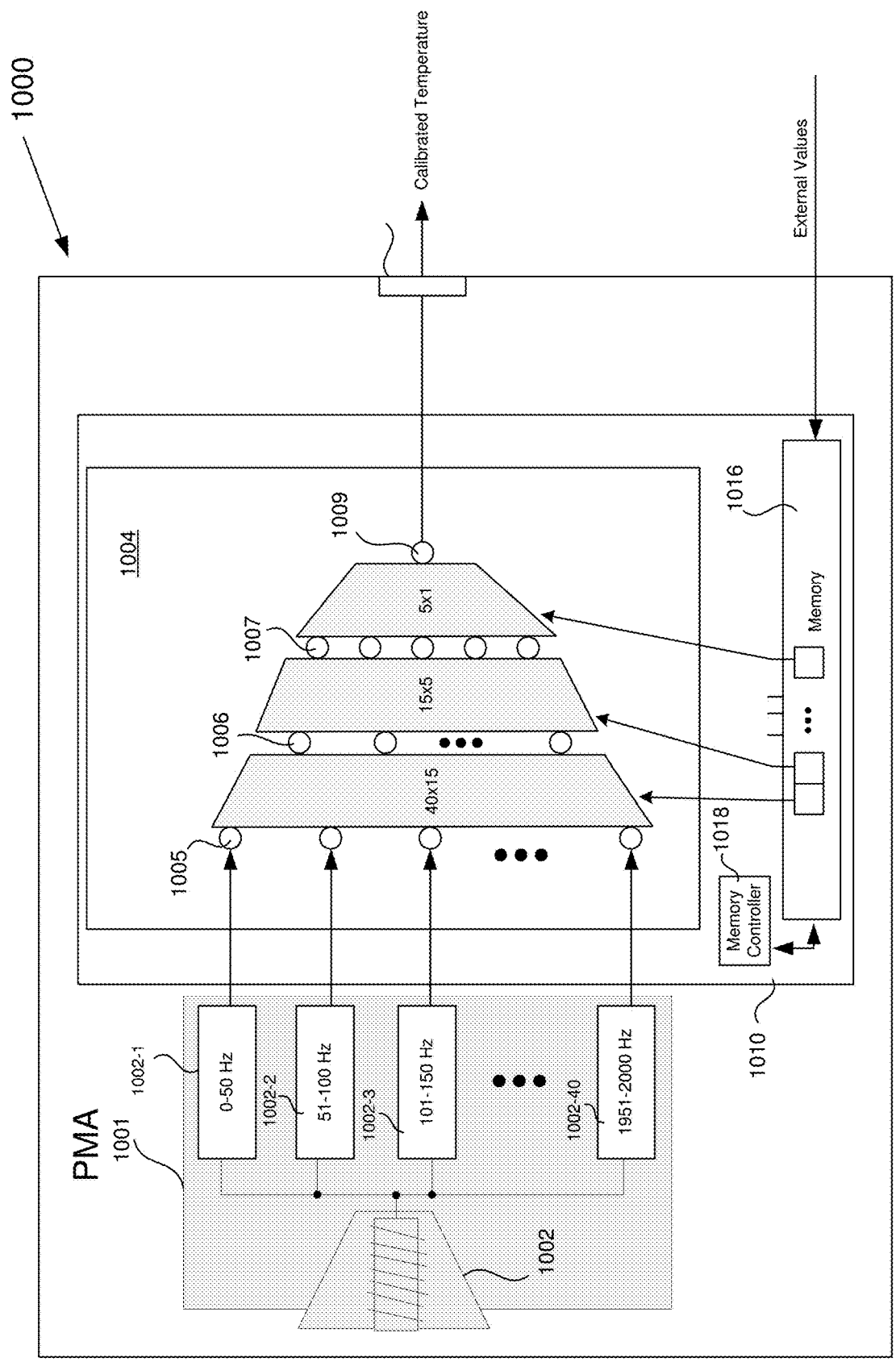
FIG. 10 is a simplified block diagram of a PMA that is appropriate for use in identifying gunshots in accordance with some embodiments of the disclosed method and apparatus.

FIG. 10 is a simplified block diagram of a PMA 1000 that is appropriate for use in identifying gunshots in accordance with some embodiments of the disclosed method and apparatus. In the PMA 1000, a sensor 1001 comprises a microphone 1002 coupled to forty filters 1003 that are used to provide input signals to a neural network 1004 within an event detection module 1006. Each sensor 1002 is tuned to a different 50 Hz audio band within the range of 0 to 2000 Hz. The output of each sensor 1002 is coupled to a corresponding one of forty input nodes 1005 that comprise an input layer. Outputs of input nodes 1005 are coupled to fifteen input nodes 1006 that comprise a first hidden layer. The outputs from the nodes 1006 of the first hidden layer are coupled to five input nodes 1007 that comprise a second hidden layer. The nodes 1007 of the second hidden layer are coupled to an output node 1009, which provides an output from the neural network 1004. Similar to the other embodiments described above, weights are stored in a memory 1016 within the event detection module 1010. In some embodiments, the values of the weights to be applied in the neural network 1004 are determined by an external device based on samples that are either provided by the filters 1002 within the PMA 1000 or samples that originated in the external device based on prior knowledge of the nature of the output that would be likely to be output by the filters 1002 when the event at issue occurs. In some embodiments, the event at issue is a gunshot. In particular, the architecture shown in FIG. 10 can be used to detect whether a gun was fired, but also to identify the type of gun from among several potential guns for which the neural network weights were trained to detect.

Figure 11:
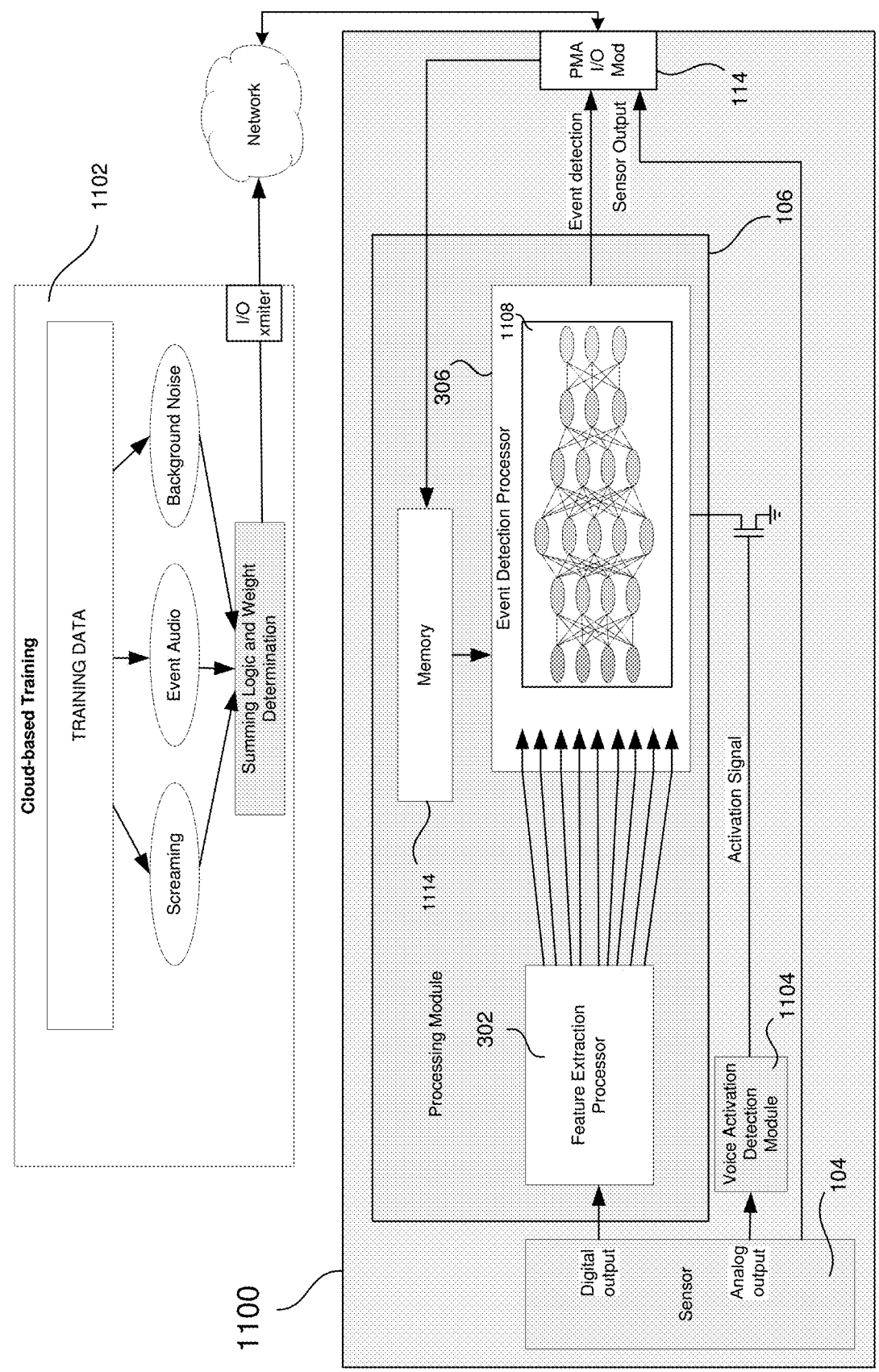
FIG. 11 is a simplified block diagram of a PMA and a cloud-based training logic.

FIG. 11 is a simplified block diagram of a PMA 1100 and a cloud-based training logic 1102. The PMA 1100 includes a voice activity detection module (VADM) 1104 that detects whether a voice is present among the sounds that the transducer 202 (which in this case is a microphone within the sensor 104) coupled to the input of the VADM 1104. In some embodiments, the sensor 104 provides an analog output to the VADM 1104. Upon detecting that a voice signal is present in the signal received, the VADM 1104 outputs a signal that to a power switch 1106 that controls whether power is applied to the processing module 106. The operation of the VADM 1104 is described in more detail below in connection with FIG. 12.

A digital output signal is coupled from the sensor 104 to the feature extraction module 302, which in turn provides input signals to the event detection processor 306. The event detection processor has a neural network 1108 that may be different from the neural network 702 (shown in FIG. 7) that was described above. That is, the neural network 1108 is has four hidden layers, in addition to the input layer and the output layer. Each of the hidden layers has four nodes, with the exception of the second hidden layer, which has 5 nodes.

In one embodiment, the cloud-based logic 1102 has a store of training data that it can use to simulate events and other noise, such as screaming and background noise that might be present in the environment of the PMA 1100. The cloud-based training logic uses the training data to determine the weights to be used in the event detection processor 306. Once determined, the weights are transmitted through an I/O transmitter 1112 in the cloud-based training logic 1102 to the PMA I/O module 114. The weights are then stored in memory 1114 or loaded directly into the event processor 306.

Alternatively, the cloud-based training logic 1102 receives an output transmitted from the sensor 104 through the PMA I/O module 114 and a communication network 1110. The output from the sensor 104 allows the cloud-based training logic to determine the weights to be used in the neural network 1108 based upon inputs to the sensor that can be controlled during a training period. That is, a predetermined training environment is created at the location of the PMA 1100 during a training period to provide the sensor 104 with inputs that will simulate the particular conditions that are to be expected when a detectable event occurs. Such detectable events may include any of the events noted above, including a gunshot. In addition, other conditions, such as screaming and other background noise can be presented to the sensor 104 during the training period as well to allow the training to take into account the presence of such signals. In some cases, such additional noise may assist in detecting the event. In other cases, such additional noise may be mere interference that would otherwise make it difficult to detect the event.

Figure 12:
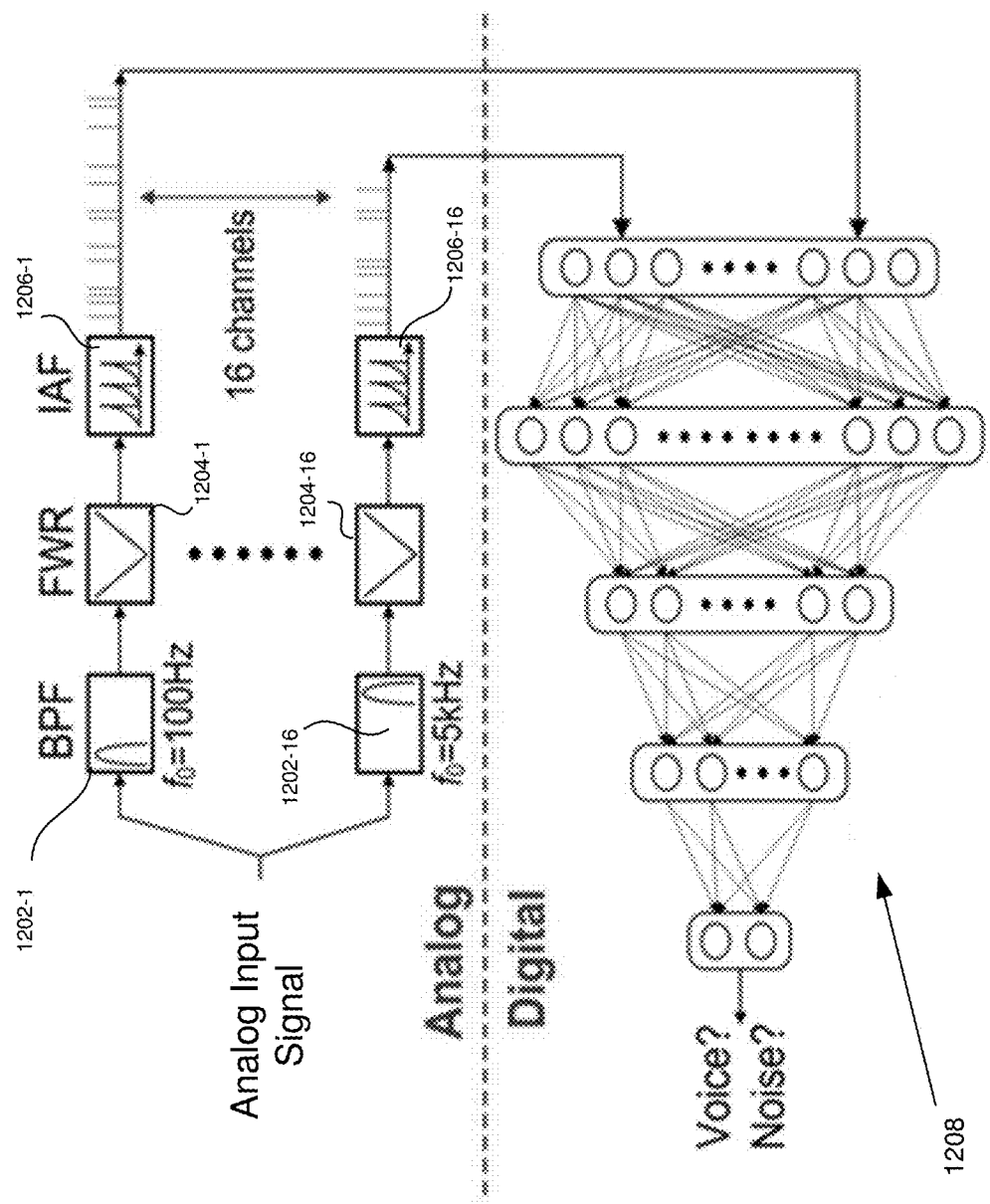
FIG. 12 is simplified block diagram of the VADM.

FIG. 12 is simplified block diagram of the VADM 1104. An analog audio output is provided from the sensor 104 to the input of the VADM 1104. The input signal is split and applied to a plurality of bandpass filters 1202. In one embodiment shown in FIG. 12, the signal is split 16 ways and applied to 16 different channels. The associated 16 bandpass filters 1202 have a center frequency spread over a band from approximately 100 Hz to 5.0 kHz. After filtration, the signal output from each filter 1202 is applied to a full-wave rectifier 1204. The outputs from each full-wave rectifier 1204 are coupled to the input of an ideal amplitude filter (IAF) 1206. The 16 outputs from the IAFs 1206 are coupled to an associated 16 inputs to a simple neural network such as binarized neural network or BNN. In such embodiments, the neural network 1208 has weights that have a binary value of zero or one. The output of the neural network 1208 indicates whether a voice was present in the input the signal applied to the VADM 1104.

Figure 13:
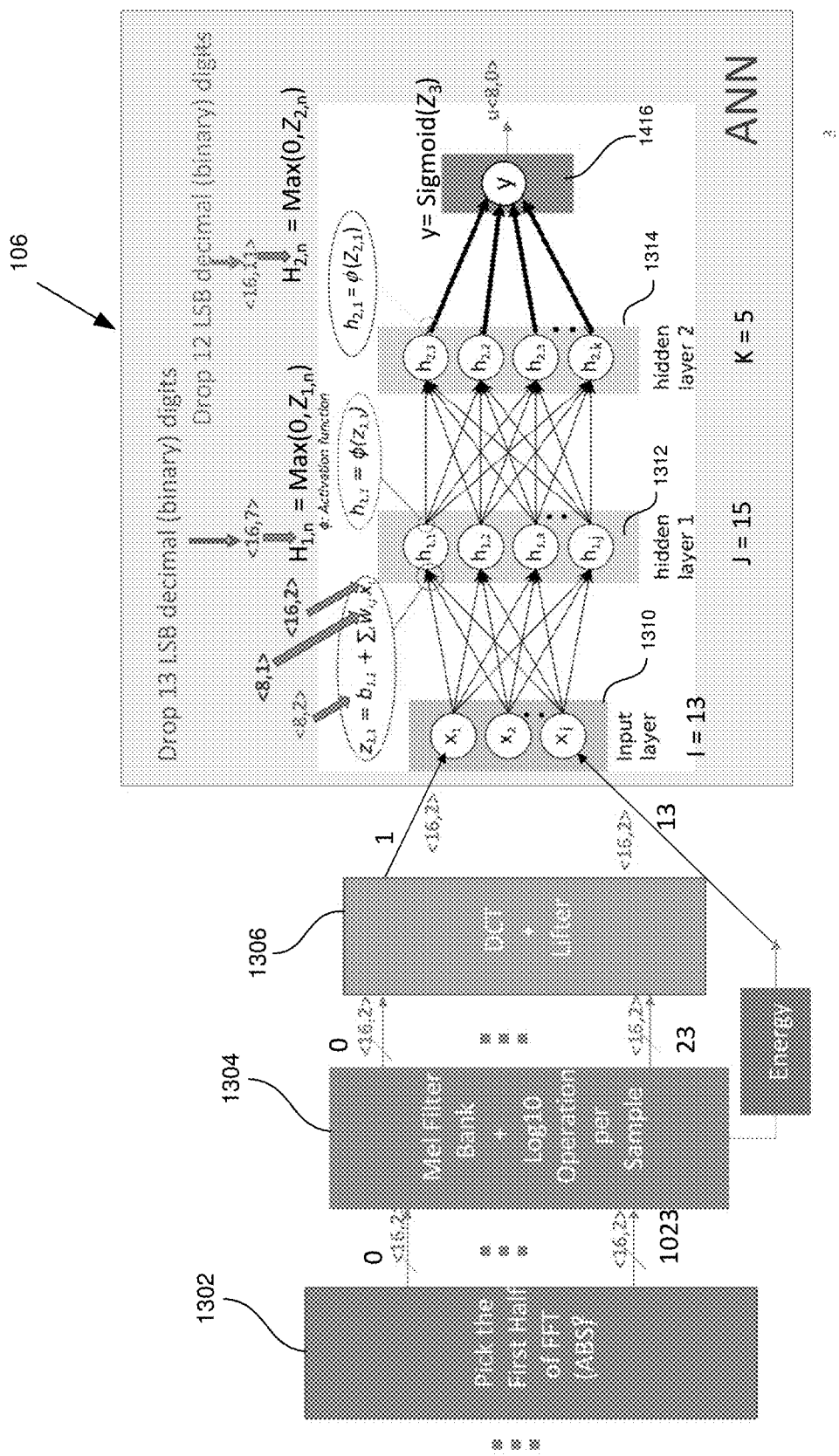
FIG. 13 is another illustration of a simplified block diagram of a processing module that includes the second half of feature extraction and the classification module.

FIG. 13 is another illustration of a simplified block diagram of a processing module 106 that includes the second half of feature extraction and the classification module. Data is provided to the processing module 106 at the input of a squaring circuit 1302. The squaring circuit attains the absolute value of the input by squaring the value provided. A Mel filter bank 1304 provides Mel filtering and also provides an output that indicates the amount of energy in the input signal. The output from the Mel filter 1304 is coupled to a discrete cosine transform (DCT) 1306. The output of the DCT 1306 is then applied to an artificial neural network (ANN) 1308. The ANN 1308 receives inputs to 13 nodes at the input layer 1310. In addition, the input layer 1310 receives the energy level output from the Mel bank 1304. The input layer 1310 provides inputs to a first hidden layer 1312 having four nodes. A second hidden layer 1414 has four nodes as well. The output layer 1416 provides an output indicative of whether the event in question has occurred.

Figure 14:
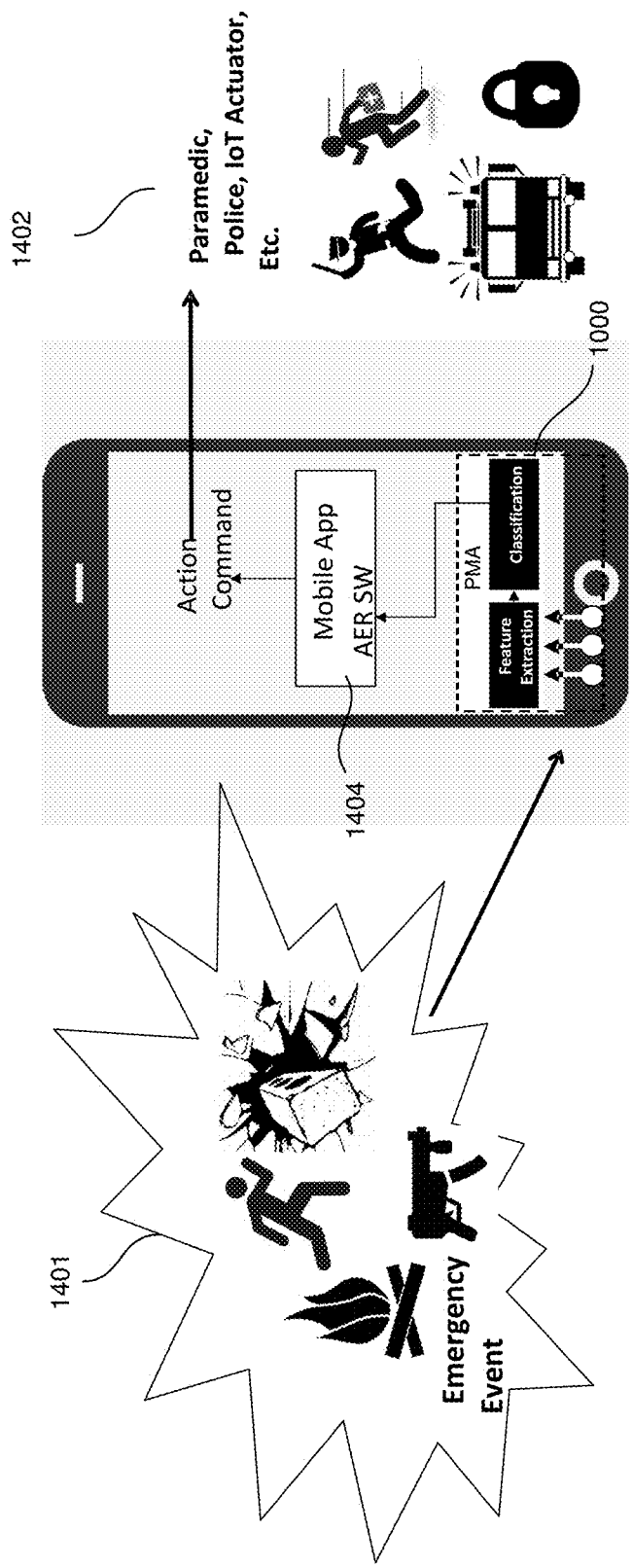
FIG. 14 is an illustration of simplified system in accordance with some embodiments of the disclosed method and apparatus in which the PMA is used to detect an emergency event.

FIG. 14 is an illustration of simplified system in accordance with some embodiments of the disclosed method and apparatus in which the PMA 1000 is used to detect an emergency situation, such as the firing of a gunshot, breaking glass, the sound and heat of a fire. In some cases, the PMA 1000 can identify the type of weapon from among six different possible weapons, including an AK-47 rifle, an AR-15 rifle, a shotgun, a 9 millimeter handgun, a .38 caliber handgun and a .45 caliber handgun or that a weapon was fired, but that the weapon did not match the sound profile of any of these six weapons. In addition, the PMA 1000 can output an indication that an emergency event 1401 has been detected. Upon detecting that a weapon was fired, an indication is sent to a paramedic, the police, an IoT actuator, etc. 1402. In some embodiments, the PMA 1000 sends a message to dispatch law enforcement officers to the location of the PMA 1000 together with an indication as to the type of weapon that was fired through a mobile application 1404 executed by a cellular phone in which the PMA is mounted.

Another application for which the PMA might be used is to accurately collection data at a wellhead of oil or gas rig. It should be noted that the PMA may be any of the embodiments disclosed above, such as the PMA 100 of FIG. 1, the PMA 900 of FIG. 9 or PMA 1000 of FIG. 10. For the sake of this description, the PMA 100 is described as one example.

Accurate sensors for measurement for pressure, temperature, and gas or oil flows in real time are connected to a control panel near the wellhead. Such sensors can be expensive and require a significant amount of power, which can lead to relatively short battery life. The result of having a short battery life is that the cost of maintaining such sensors is relatively high. In addition, due to the relatively large amount of acoustic data that must be transmitted from the sensor to a remote processor that can be make decisions based on the data, there is a significant risk of interference in the wireless connection that is typically used by the sensor to communicate the acoustic data to the processor. By employing a PMA 100 these concerns are reduced. That is, since the sensor 104 in the PMA 100 is closely coupled to the processing module 106, the chance of an error in the communication of the output of the sensor 104 to the processing module 106 is reduced. In addition, because the processing module 106 is a relatively simple device that is capable of only detecting a limited number of events for each set of weights that are applied to the neural network 702, the amount of power required to operate the PMA 100 is less than is otherwise required to perform the same level of functionality. In addition, due to the simplicity of the PMA 100, the cost of performing the same function is reduced.

In yet another example application, a PMA, such as the PMA 100, may be used to perform medical diagnostics. For example, a PMA 100 can be loaded with data pre-trained to detect cardiac abnormalities in an electrocardiogram (ECG) signal. Detection of such abnormalities can result in the prevention of ventricular fibrillation (VF). In addition, a continuous monitoring of the heart can be performed to assist in detecting abnormalities.

Figure 15:
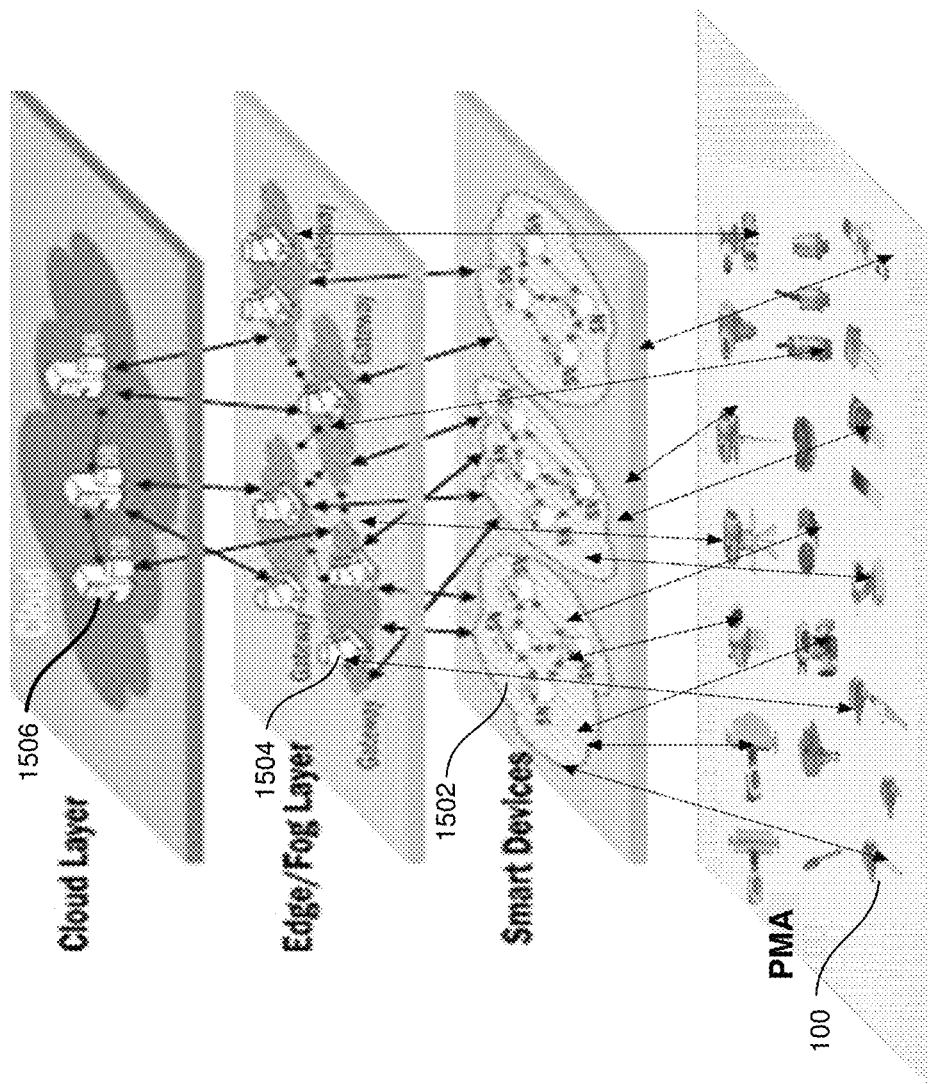
FIG. 15 is another illustration of the ecosystem in which a PMA might be used within a hierarchy of an IoT network.

FIG. 15 is another illustration of the ecosystem 1500 in which a PMA 100, 900, 1000 might be used. A PMA 100 that may comprise any one of several types of sensors 104, communicates with one or more smart devices within a network of smart devices 1502. The network of smart devices is coupled to one or more gateways 1504. The gateways, in turn, are coupled to the cloud 1506. The architecture shown in FIG. 15 may be used in several applications, such as smart homes, smart building, smart cities, the hospitality industry, the gas & oil industry, the mining industry, eHealth, etc.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above-disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A processor-based mini-sensor assembly (PMA) comprising:
    a) a PMA package;
    b) a sensor residing within the PMA package;
    c) a processing module having an output port and an input, the input coupled to the sensor and residing within the PMA package, the processing module configured to receive an output signal from the sensor and to detect the occurrence of a predetermined event based on the power spectrum of the signal output from the sensor; and
    d) a PMA output port coupled to the output port of the processing module for providing a signal indicative of the occurrence of the predetermined event.

2. The PMA of claim 1, wherein the processing module comprises:
    a) a feature extraction module having an input coupled to the input of the processing module, the feature extraction module having an output; and
    b) an event detection module having an input coupled to the output of the feature extraction module and an output coupled to the output port of the processing module, the event detection module outputting the signal indicative of the occurrence of the predetermined event based upon a signal output from the feature extraction module.

3. The PMA of claim 2, wherein the feature extraction module comprises a Mel-frequency cepstrum processor and outputs a Mel-frequency cepstrum (MFC) representation of the sensor output from the sensor.

4. The PMA of claim 3, wherein the event detection module comprises a neural network.

5. The PMA of claim 4, further including a memory device residing within the PMA package for storing values useful in the operation of the neural network.

6. The PMA of claim 5, wherein the values stored in the memory are weights used by the neural network to detect patterns in the output of the feature extraction module that indicate that the event has occurred.

7. The PMA of claim 6, further comprising a memory controller, wherein the memory controller is coupled to the memory and configured to control the storage within the memory of values provided from a source external to the PMA package.

8. The PMA of claim 7, wherein the values stored within the memory are neural network weights determined by a system external to the PMA, and for which the values of the weights are determined such that when applied to the neural network, the values train the neural network to detect the predetermined event.

9. The PMA of claim 8, wherein the neural network is a one-dimensional convolutional neural network.

10. The PMA of claim 6, wherein the sensor is an audio sensor.

11. The PMA of claim 10, wherein detection of the predetermined event triggers an alarm.

12. The PMA of claim 11, wherein the alarm indicates the potential for personal injury to people located in proximity of the sensor.

13. The PMA of claim 12, in which the predetermined event is an event selected from the group comprising: discharge of a weapon; breaking of glass; collision of a vehicle; screaming of a person; and crowd noise indicative of a dangerous event.

14. The PMA of claim 12, in which the predetermined event is a discharge of a weapon.

15. The PMA of claim 14, wherein the signal output from the PMA output port indicates the type of weapon that has been discharged.

16. The PMA of claim 11, wherein the alarm indicates that a mechanical device in the proximity of the sensor is defective.

17. The PMA of claim 11, wherein the alarm indicates that a mechanical device in the proximity of the sensor is in need of service.

18. The PMA of claim 6, wherein the sensor is a temperature sensor.

19. The PMA of claim 18, wherein the signal output through the PMA output port is indicative of an out of bounds temperature condition.

20. The PMA of claim 6, wherein the sensor is a sensor selected from the group comprising: temperature sensors; pressure sensors; cameras; vibration sensors, and moisture sensors.

* * * * *